United States Patent [19]

Gearn et al.

[11] Patent Number: 5,070,818
[45] Date of Patent: Dec. 10, 1991

[54] CATTLE CONVEYOR

[76] Inventors: Timothy A. Gearn, Rte. 5; Kennard D. Gearn, Jr., 232 Ranger, both of Hereford, Tex. 79045

[21] Appl. No.: 631,470

[22] Filed: Dec. 21, 1990

[51] Int. Cl.⁵ ............................................. A01K 29/00
[52] U.S. Cl. ........................................ 119/82; 119/158
[58] Field of Search ................ 119/28, 82, 102, 103, 119/155, 158

[56] References Cited

U.S. PATENT DOCUMENTS

| 2,526,037 | 10/1950 | Murphy | 119/158 |
| 4,850,308 | 7/1989 | Padgett | 119/82 |

FOREIGN PATENT DOCUMENTS

| 1142120 | 2/1985 | U.S.S.R. | 119/158 |
| 1147307 | 3/1985 | U.S.S.R. | 119/158 |

Primary Examiner—John G. Weiss
Attorney, Agent, or Firm—Richards, Medlock & Andrews

[57] ABSTRACT

A device (10) is disclosed for conveying cattle (12, 14, 16) along a path to a treatment position (18) by a conveyor assembly (20). The conveyor assembly (20) includes a conveyor belt (26) which supports the animal above the ground at its brisket so that the animal cannot move independently along the conveyor assembly. Air bags (50, 54) or other structure are used to hold the legs of the animal in a gentle confining manner as the animal is conveyed along the conveyor belt. A head gate (48) is mounted at the treatment position to hold the head of the animal. The entire device can be surrounded by a housing (60) which provides a darkened tunnel to calm the animal and encourage the animal to move to the treatment position.

8 Claims, 1 Drawing Sheet

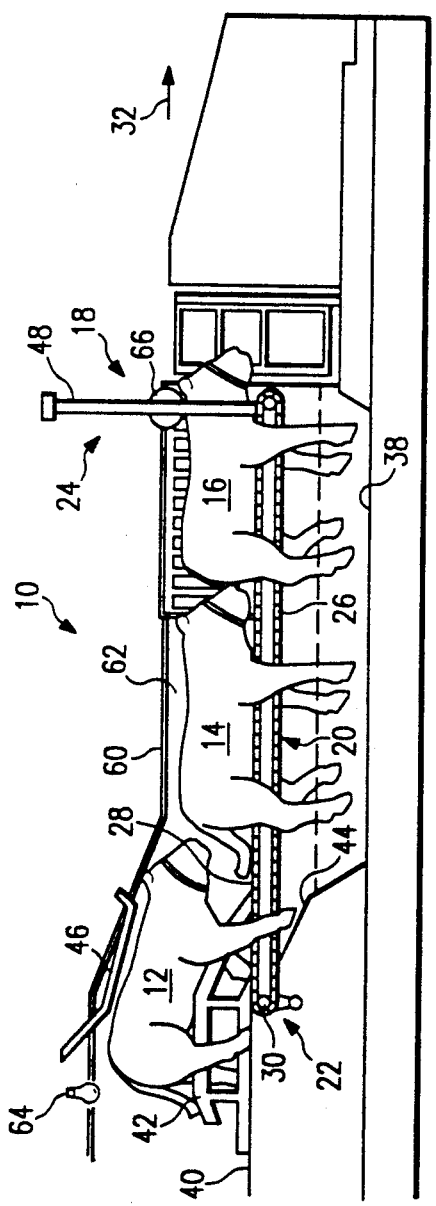
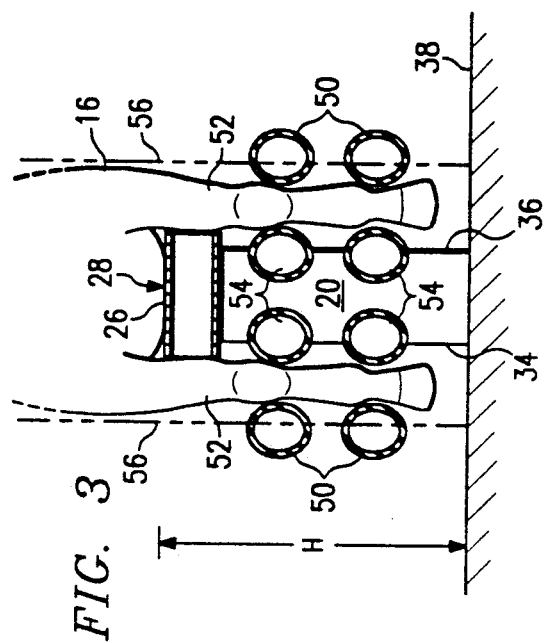
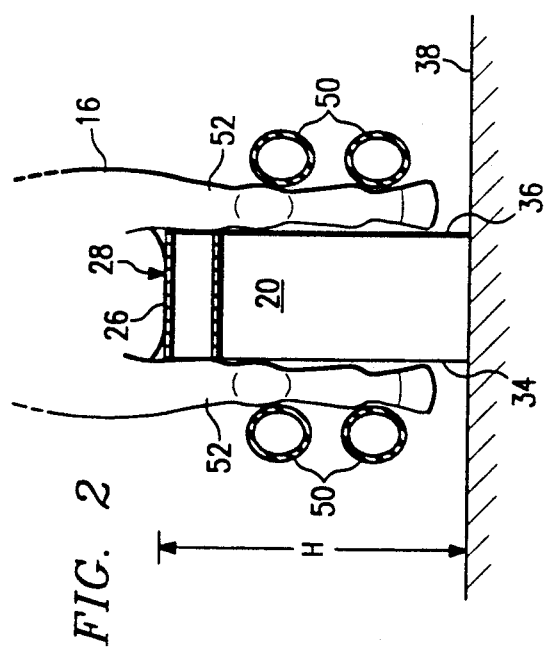

5,070,818

CATTLE CONVEYOR

TECHNICAL FIELD OF THE INVENTION

This invention relates to the raising of cattle, and in particular, a mechanism to quickly and easily guide cattle to a treatment position with minimum harm to the cattle.

BACKGROUND OF THE INVENTION

In raising cattle, whether for beef, breeding or dairy purposes, there is a reoccurring need to treat the cattle with various drugs, medicine, vitamins and even to artificially inseminate cows. Any one of these treatments requires the cattle to be positioned so the treatment can be performed. As can easily be understood, the massive weight of the animal, combined with the fact the animal might be very upset about having some of these treatments performed, can make these treatments difficult, if not dangerous to both the cattle and the operator.

In the past, one approach to facilitating the treatment of cattle is to guide them into a long narrow chute, one by one, so that the animals are confined within the chute and can be treated individually as they move along the chute. One common device to perform this action is a standard hydraulic squeeze chute. However, these prior techniques are labor intensive and can often result in injury to the animals as they thrash around within the chute. Thus, a need exists for an improved technology to treat cattle which minimizes the labor necessary and prevents harm, or even distress to the animal to the degree possible.

SUMMARY OF THE INVENTION

In accordance with one aspect of the present invention, a device is provided for transporting cattle to a desired location along a surface. The device includes a conveyor assembly having a first end and a second end. The conveyor assembly includes a conveyor belt having an upper reach which is elevated a predetermined distance above the surface. Mechanisms are provided to drive the conveyor belt on the conveyor assembly so that the upper reach moves along a first direction from the first end to the second end of the conveyor assembly. A structure is further provided to position cattle so that the brisket of the cattle contacts the upper reach of the conveyor belt at the first end of the conveyor assembly with the legs of the cattle straddling the conveyor assembly. The upper reach is positioned at a height above the surface sufficient to prevent the cattle from obtaining purchase with its legs to move itself along the conveyor belt. The motion of the cattle is determined solely by the motion of the conveyor belt. The conveyor belt can then be moved to move the cattle to the second end for treatment.

In accordance with another aspect of the present invention, a structure is provided to force the legs of the cattle against the sides of the conveyor assembly to prevent unnecessary motion or injury to the cattle. The structure can comprise inflatable air bags to accommodate cattle of varying size. In a further aspect, additional air bags can be mounted at the sides of the conveyor assembly to support the legs of the cattle from the inside. Inflatable air bags can be mounted on both the outside and inside of the cattle legs if desired.

In accordance with another aspect of the present invention, a housing is formed about the structure and conveyor assembly to define a darkened tunnel, at least from where the cattle is positioned on the conveyor belt to the second end of the conveyor assembly, the light the animal sees at the opening of the tunnel at the second end of the conveyor assembly inducing the animal to move onto the conveyor belt because of attraction to the light.

In accordance with another aspect of the present invention, a head gate can be mounted at the second end of the conveyor assembly to hold the head of the cattle during treatment. An air bag can be used at the head gate to more firmly and safely secure the head of the animal.

BRIEF DESCRIPTION OF THE DRAWINGS

Further objects and advantages of the invention will become more apparent from the following description and claims, and from the accompanying drawings wherein:

FIG. 1 is an illustrative cross-sectional view of a device forming a first embodiment of the present invention illustrating the cattle moving along the conveyor belt to the treatment position;

FIG. 2 is a vertical cross-sectional view of one version of the device which utilizes air bags acting on the legs of the cattle to confine the legs against the sides of the conveyor assembly for reducing the motion of the cattle; and FIG. 3 is a vertical cross-sectional view of another version of the device which incorporates air bags on both the inside and outside of the legs of the cattle to more firmly secure the legs.

DETAILED DESCRIPTION

With reference now to the accompanying drawings, wherein like reference numerals designate like or corresponding parts throughout the several views, a device 10 is illustrated which forms a first embodiment of the present invention and is used to convey cattle 12, 14 and 16 to a treatment position 18 for treatment. As discussed previously, treatment of cattle can range from inoculations for diseases or vitamins, artificial insemination, tagging the ears for identification or any other of a myriad of treatments necessary for raising cattle from birth to full grown size.

As will be understood as the device 10 is described, the device provides a very efficient and safe method for conveying the cattle to the treatment position which minimizes the labor necessary to perform the function and also minimizes the trauma, whether physical or even emotional to the cattle, as they are moved into the treatment position.

The device 10 includes a conveyor assembly 20 which extends from a first end 22 to a second end 24. The second end coincides with the treatment position 18. The conveyor assembly 20 mounts a continuous conveyor belt 26 which has an upper reach 28 which extends between the first and second ends 22 and 24. The conveyor assembly 20 includes a drive mechanism 30, preferably a reversible hydraulic motor, to move the conveyor belt so that the upper reach 28 of the belt can be moved in the direction of arrow 32 from the first end to the second end, or in a reverse direction if desired. The conveyor assembly also defines first side 34 and second side 36 which extend downward from the upper reach 28 of the conveyor belt to a surface 38 on opposite sides of the belt, as best seen in FIGS. 2 and 3. The distance H between the upper reach 28 and the surface 38 is carefully chosen to be longer than the legs of any of the cattle to be conveyed, as will be explained hereinafter.

The device 10 includes a ramp 44 of a conventional nature which the cattle is guided onto and along until the cattle approaches the leg spreader bars 42 shown in FIG. 1. The leg spreader bars cause the animal to be positioned in a forward orientation relative to the direction of movement of the conveyor belt so that as the cattle walks off the ramp 40 and down a cleated non-slip entrance ramp 44 which descends to the surface 38, the legs of the cattle are properly positioned on either side of the conveyor belt so that the belly or brisket of the cattle moves into contact with the upper reach 28 of the conveyor belt 26 at the first end 22 of the conveyor belt 26. A hold down rack 46 positioned above the leg spreader bars in the device prevents the animal from rearing as it moves onto the conveyor belt.

As mentioned previously, the height H of the upper reach 28 of the conveyor belt 26 is chosen so that the legs of the animal basically dangle downward and do not come into contact with the surface 38 so that the animal cannot move of its own free will along the conveyor belt. Thus, the motion of the animal is determined by the movement of the conveyor belt under the control of the operator. As the animal moves to the second end 24 of the belt, a conventional stanchion head gate 48 can be used to hold the head of the animal forward further confining the animal for whatever treatment is desired.

FIG. 2 illustrates the use of inflatable air bags 50 mounted on the device 10 which are used to urge the legs 52 of the animal inward against the sides 34 and 36 of the conveyor assembly 20. This acts to confine the legs of the animal and resist the animal from thrashing about. The use of inflatable air bags 50 also permits the conveyor assembly 20 and device 10 to be utilized with cattle of different sizes. For example, the air bags 50 would be inflated to a larger dimension if the animal had small legs to insure that the legs would be held against the sides. The air bags would not be inflated as much if the animal was larger and so forth. In one embodiment of the present invention, two air bags 50 were used on each side of the conveyor assembly, as shown in FIG. 2, and the air bags were formed by continuous rubber hoses of eight inch inflated diameter running the entire length between the first and second ends of the conveyor assembly.

In another version, as illustrated in FIG. 3, similar air bags 54 can be mounted on the sides 34 and 36 of the conveyor assembly 20 to confine the inside of the legs of the animal. The air bags 54 can be utilized alone, with a rigid, flat, non-inflatable surface 56 (shown in dotted line in FIG. 3) forming the walls of the device 10 against which the animal's legs are confined, or with air bags 50 as shown in FIG. 3, to provide enhanced confinement of the legs.

Also, it has been observed that cattle in the dark become calm and nonaggressive. The cattle react the same way at night when a predator is close, for example. Cattle are not color blind, and in fact have better eye sight that human beings. The device 10 is designed to take advantage of this natural reaction.

The device 10 is provided with a nontransparent housing 60 which surrounds the entire mechanism of the device, including ramp 44, bars 42, entrance ramp 40 and the conveyor assembly 20. The housing 60 thus defines a tunnel 62 through the device 10. As the cattle walks along the ramp 40, it is in the dark. The only light visible to the animal is the opening of the tunnel 62 at the second end 24 of the conveyor assembly. Thus, the animal will tend to feel trapped within the tunnel 62 and see what appears to be a way out in the direction of the second end 24. Thus, the cattle tends to move in the direction desired within the device 10 which facilitates the entire operation. Because the animal will have a tendency to move in the direction desired anyhow, use of standard techniques to move cattle, such as an electric prod, will be needed much less often.

The attraction of the animal to light can be used to facilitate the movement of the animal up the ramp 40 as well. If the animal is placed at the entrance of the device 10, at the beginning of the ramp 40 (not shown) a light 64 can be placed at the top of the ramp near the hold down rack 46 which attracts the animal up the ramp. As the animal gets to the top of the ramp, it will walk onto the belt and the next light the animal notices will be the exit of the tunnel 62 at the treatment position 18. During this entire procedure, the animal will be calm and subject to minimum stress. Stress and fear affects an animal for weeks after the incident and even seems to weaken the immune system making it easier for disease to harm the animal. Beyond simple humanity to the animal, the regulations governing animal treatment may vary in the future due to the result of the influence of animal rights groups which makes the device of the present invention perhaps one of the few or only conveying mechanisms which would be acceptable.

The head gate 48 can also be provided with an air bag 66 which can be inflated, as illustrated in FIG. 1, to more securely hold the head of the animal. By using a reversible motor in the drive mechanism 30, the conveyor belt can be moved back and forward if necessary during the treatment of the animal. Also, by using a hydraulic motor and providing air bags or other soft, sound-absorbing materials to confine the animal, the sound levels in the device 10 are minimized, thus also minimizing the stress to the animal due to excessive noise levels.

In one design of the present invention, the conveyor belt is ten inches wide. The belt itself is made of multiply PVC belting with nylon reinforcing cords. The device itself is designed to accommodate the cattle within a range of 350-850 pounds by proper inflation of the air bags as required to confine the legs of the animals, without injuring them. While inflatable air bags are preferred, rubberized curtains or similar confining structures can be used as a substitute. The rubber curtains can be moved toward or away from the sides of the conveyor assembly as necessary to properly confine the animal of a given size.

While several variations of the present invention have been illustrated in the accompanying drawings and described in the foregoing detailed description, it will be understood that the invention is not limited to the variations disclosed, but is capable of numerous rearrangements, modifications and substitutions of parts and elements without departing from the scope and spirit of the invention.

We claim:

1. A device for transporting cattle to a desired location for treatment and subsequent live release, comprising:

a conveyor assembly having a first end and a second end, said conveyor assembly including a conveyor belt having an upper reach elevated a predetermined distance above a surface, and means to drive the conveyor belt so that the upper reach moves along a first direction from the first end to the second end; and means to position cattle so that the brisket of the cattle contacts the upper reach of the conveyor belt at the first end of the conveyor assembly with the legs of the cattle straddling the conveyor assembly, the upper reach positioned at a height above the surface to prevent the cattle from obtaining purchase with its legs on the surface to prevent the cattle from moving itself along the conveyor belt, the motion of the cattle being determined solely by the motion of the conveyor belt, the cattle moving to the second end which coincides with the treatment location, the conveyor belt moving the cattle off the second end to release the cattle to walk away from the device.

2. The device of claim 1 wherein the conveyor assembly further has first and second sides extending between the upper reach of the conveyor belt and the surface on either side of the conveyor belt and extending between the first and second ends, said device further comprising means to force the legs of the cattle against the sides of the conveyor assembly to prevent unnecessary motion or injury to the cattle as it moves along the conveyor assembly.

3. The device of claim 1 further comprising a head gate mounted at the second end of the conveyor assembly to hold the head of the cattle for treatment.

4. The device of claim 1 further comprising a housing about the conveyor assembly and positioning means to define a darkened tunnel along which the cattle is conveyed.

5. The device of claim 1 further comprising a ramp leading to said positioning means for cattle to walk to the positioning means.

6. The device of claim 5 wherein a housing extends about the ramp to define a darkened tunnel along which the cattle walk to the positioning means.

7. The device of claim 2 wherein said means to force the legs of the cattle against the sides of the conveyor assembly comprise at least one inflatable rubber hose on each side of the conveyor assembly which can be inflated to a degree determined by the size of the legs of the cattle to firmly confine the legs as the cattle is conveyed along the conveyor assembly.

8. The device of claim 1 further comprising first and second walls facing the first and second sides of the conveyor assembly, respectively, and extending along the device from the first end to the second end of the conveyor assembly, said device further comprising means mounted on said first and second sides to urge the legs of the cattle against the walls as the cattle is conveyed along the conveyor assembly.

* * * * *